(12) United States Patent
Zhang

(10) Patent No.: US 7,100,232 B2
(45) Date of Patent: Sep. 5, 2006

(54) VEHICLE RAMP

(75) Inventor: Shouyun Zhang, Chino Hills, CA (US)

(73) Assignee: Larin Corporation, Ontario, CA (US)

( * ) Notice: Subject to any disclaimer, the term of this patent is extended or adjusted under 35 U.S.C. 154(b) by 0 days.

(21) Appl. No.: 10/984,041

(22) Filed: Nov. 8, 2004

(65) Prior Publication Data

US 2006/0123568 A1   Jun. 15, 2006

(51) Int. Cl.
*E01D 1/00* (2006.01)
(52) U.S. Cl. .......................................... 14/69.5; 254/88
(58) Field of Classification Search ................ 14/69.5, 14/71.1, 72.5, 49.6; 254/88
See application file for complete search history.

(56) References Cited

U.S. PATENT DOCUMENTS

| | | | | |
|---|---|---|---|---|
| 1,548,189 A | * | 8/1925 | Costello ....................... | 254/88 |
| 3,863,895 A | * | 2/1975 | Grewe et al. ................. | 254/88 |
| 4,020,957 A | * | 5/1977 | Wren .......................... | 414/537 |
| 4,246,982 A | * | 1/1981 | Pretnick ..................... | 184/106 |
| 4,761,847 A | * | 8/1988 | Savage et al. ............... | 14/69.5 |
| 4,779,298 A | * | 10/1988 | Nichols et al. .............. | 14/69.5 |
| 4,920,596 A | * | 5/1990 | Stevens ...................... | 14/69.5 |
| 5,440,773 A | * | 8/1995 | Lentini ...................... | 14/69.5 |
| 5,855,359 A | * | 1/1999 | Chipperfield ................ | 254/88 |
| 6,431,815 B1 | * | 8/2002 | Zarzecki et al. ............ | 414/537 |
| 6,536,064 B1 | * | 3/2003 | Swink et al. ................ | 14/69.5 |
| 6,539,572 B1 | * | 4/2003 | Ware .......................... | 14/69.5 |
| 6,575,516 B1 | * | 6/2003 | Webber ....................... | 296/61 |
| 6,722,721 B1 | * | 4/2004 | Sherrer et al. ............... | 296/61 |
| 6,910,675 B1 | * | 6/2005 | Cox ............................. | 254/1 |
| 2002/0088065 A1 | * | 7/2002 | Schmaltz et al. ............ | 14/69.5 |
| 2004/0143915 A1 | * | 7/2004 | Schomaker et al. ......... | 14/69.5 |

* cited by examiner

*Primary Examiner*—Raymond Addie
(74) *Attorney, Agent, or Firm*—Greenberg Traurig LLP

(57) ABSTRACT

A ramp for a vehicle comprises an elongated track with a leading end and a trailing end. The leading end engages a flatbed platform of a vehicle, and the trailing end engages a ground surface so that there is a slope between the leading and trailing ends when the ramp is in a first usage. The elongated track is constituted by multiple engaging elements. The elements are movable relative to each other so that the elements are capable of being packed in a stack to define a platform for a wheel of a vehicle. This permits raising of the wheel of a vehicle above the ground level. There is a hinge between adjacent elements, and the elements of the ramp are hinged at opposite ends for relative folding to permit for a stacked relationship about adjacent ends.

19 Claims, 3 Drawing Sheets

VEHICLE RAMP

BACKGROUND

1. Field

An apparatus and method is disclosed relating to use as a ramp or a platform, and more particularly, relating to a ramp or platform for a vehicle.

2. General Background

Some vehicles and trucks have a flatbed platform or rear cargo area into which All Terrain Vehicles (ATVs) or other wheeled units and apparatus need to be loaded. To solve this problem, different devices have been previously used as a ramp that can run up a slope from a ground level to the flat bed height. These are elongated ramps and are for a single purpose. Separately, it is often necessary to raise a wheel or pair of wheels of a vehicle above the ground. These are also for a single purpose use. Different kinds of ramps are used for this second purpose.

The various uses of the ramps are not as versatile as possible. The disclosure is directed towards an improvement which seeks to allow ramps to serve multiple purposes.

SUMMARY

A ramp for a vehicle comprises an elongated track with a leading end and a trailing end. The leading end is for engaging a horizontal platform of a vehicle, and the trailing end is for engaging a ground surface so that there is a slope between the leading and trailing ends when the ramp is in a first usage relationship with the vehicle. The elongated track is constituted by multiple engaging elements.

The elements are movable relative to each other so that the elements are capable of being packed in a stack to define a platform for a wheel of a vehicle. This permits raising of the wheel of a vehicle above the ground level. This raising of the vehicle above a ground level is a second usage of the ramp.

A lead member of the ramp includes two portions anchored to the track. A first portion engages with the leading element of the ramp in a substantially parallel relationship with the track. A second portion of the lead member is angulated relative to the track of the ramp. The second portion is for engaging on a flatbed of the vehicle when in a first use. In a second use, this lead member engages with the stacked elements so as to facilitate permitting a wheel of a vehicle to roll up and onto the stacked elements.

There is a hinge transversely located between adjacent elements, and the elements of the ramp are hinged at opposite ends for relative transverse folding to permit for a stacked relationship about adjacent ends of adjacent elements. The longitudinal direction is between the leading end and the trailing end.

There are generally two ramps in use with a vehicle. As such, there are a pair of separate tracks. One track is for permitting the front and rear left-hand wheels of an ATV or accessory to be rolled onto a flatbed related to the vehicle. The other track being for the front and rear wheels of the right-hand side of the ATV or accessory to be rolled onto the flatbed in the first use. The two tracks in a second use are for raising respectively left and right wheels of a vehicle.

There can be friction elements on a surface of each track. The friction elements can be at least one of spaced slots or apertures, selectively with one or more ridges.

When the track is an elongated position in the first use, the elements of the track are rotatable, in part, in a transverse axis relative to a longitudinal direction of the track to permit the second use mode. The hinges permit the elements to rotate transversely and fold in first manner to be stacked in a packed relationship for the second use mode. The hinges permit the elements to be unfolded and aligned in an elongated manner and to inhibit folding in a manner opposite to the manner when the track is in the elongated longitudinal position in the first use mode.

Other objects and features of the disclosure will become apparent from the following detailed description and accompanying drawings.

DETAILED DESCRIPTION

Figure 1:
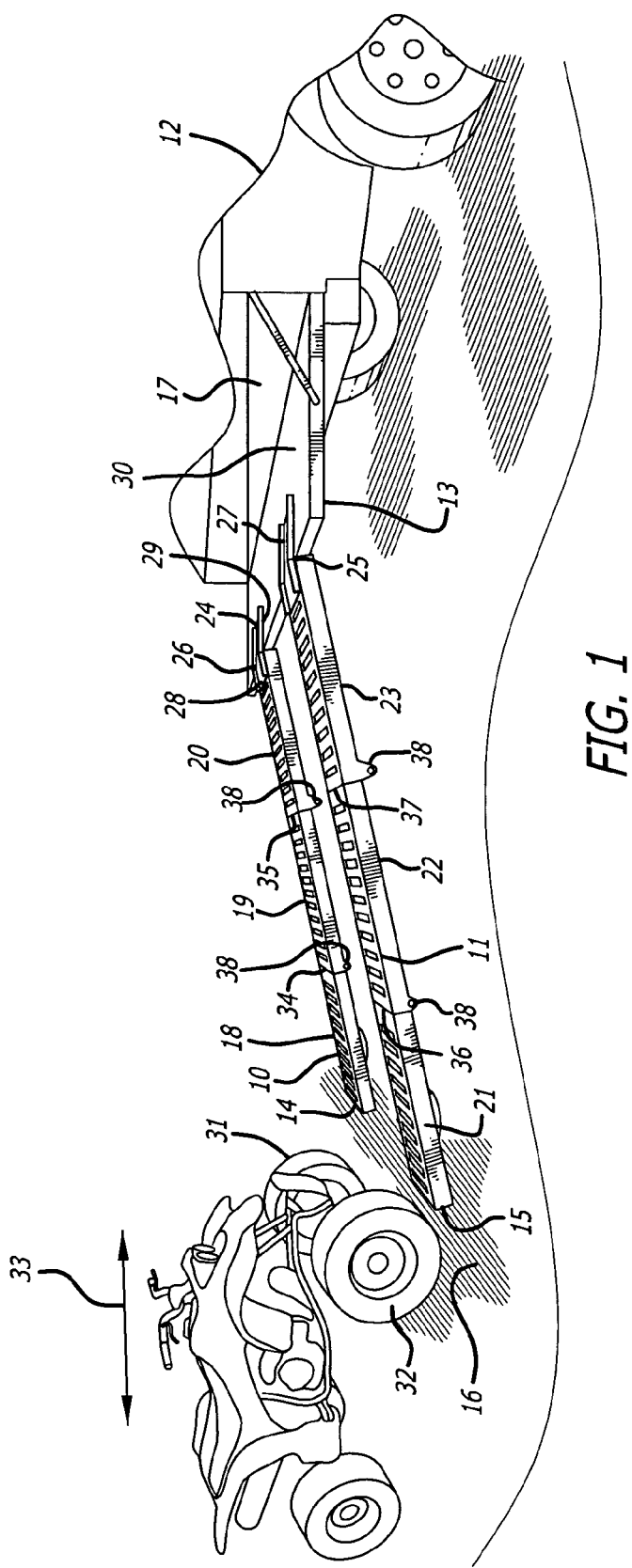
FIG. 1 is the ramp in the first operative situation elongated between the ground and the tailgate of a vehicle. A pair of ramps is shown in FIG. 1.

There are two ramps 10 and 11 for a vehicle 12. The ramps 10 and 11 are shown located on the tailgate 13 of the vehicle 12. The trailing ends 14 and 15 of the ramps 10 and 11 engage the ground surface 16 in a sloping manner such that an ATV or other unit can be wheeled up the tracks of the ramps 10 and 11 and onto the flatbed platform 17 at the rear of the vehicle or truck 12. Each of the ramps 10 and 11 are constituted by three foldable elements, namely elements 18, 19 and 20 for ramp 10 and elements 21, 22 and 23 for ramp 11. The leading ends 24 and 25 respectively of ramps 10 and 11 engage the tailgate 13. The leading member is anchored with the leading end of the ramp.

Each of the leading ends 24 and 25 include a leading member which is a plate 26 and 27 respectively. The plates 26 and 27 have a portion 28 which is substantially parallel to the elongated line of the elements 18, 19 and 20, and a portion 29 which is angulated relative to portion 28 and can lie substantially parallel with the surface 30 of the tailgate 13.

With the ramps 10 and 11 extended in the sloping position the wheels 31 and 32 of an ATV can be rolled up and down the ramps as indicated by arrow 33.

In the extended position, the interface between 18, 19 and 20 are shown by lines 34 and 35, respectively. The interfaces between sections 21, 22 and 23 are shown by lines 36 and 37, respectively.

There are hinge formations 38 between each of the elements 18, 19 and 20, and between elements 21, 22 and 23. The hinge formations 38 are formed such that when the elements are in the extended position as shown in FIG. 1, the interface lines are an abutment, and each of the elements 18, 19 and 20, respectively, prevent the buckling or downward movement of the ramp 10. The elements 21, 22, and 23 are inter-located or in engagement to prevent the downward movement of the ramp 11.

Figure 2:
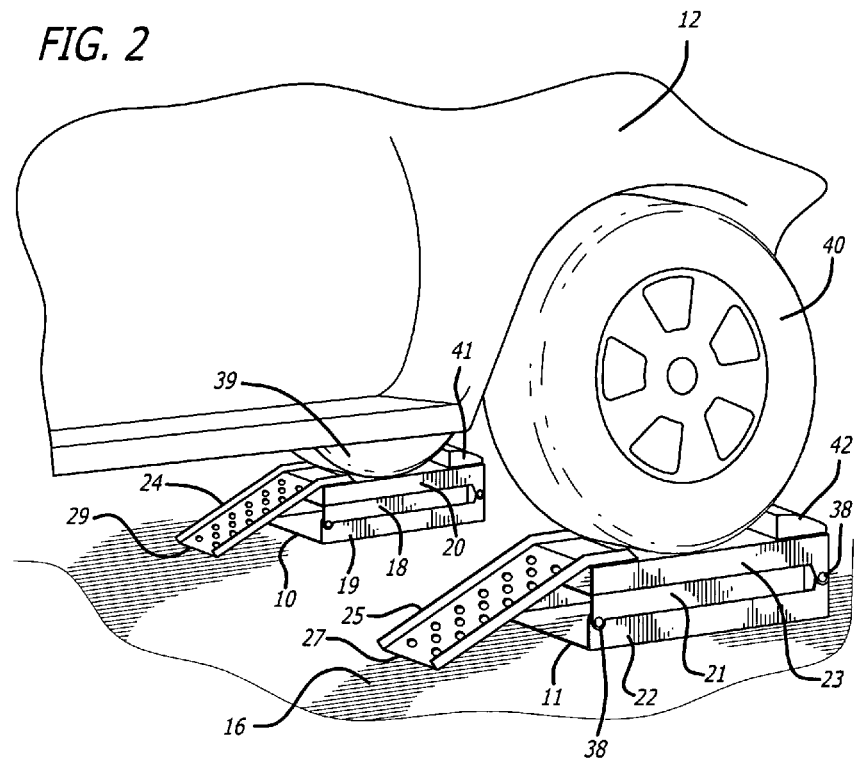
FIG. 2 shows a pair of ramps in the second operative position, folded in an inclined manner under two wheels of a vehicle.

As shown in FIG. 2, there is the vehicle 12 with tires 39 and 40 for respective wheels. The tires are respectively mounted on a folded ramp 10 and a folded ramp 11. The elements of the ramp 10 are shown as 20, 18 and 19. Element 19 engages the ground surface 16.

For the ramp 11 there are the elements 23, 21 and 22 in the folded position, with the element 22 engaging the ground surface 16. The leading ends 27 and 29 are formed so that they slope respectively towards the leading plate 25 and the leading plate 24 of ramps 11 and 10. The hinges 38 permit for folding of the section 18 between the sections 19 and 20 for ramp 10. Similarly section 21 is folded between the elements 22 and 23 of the ramp 11.

Figure 4:
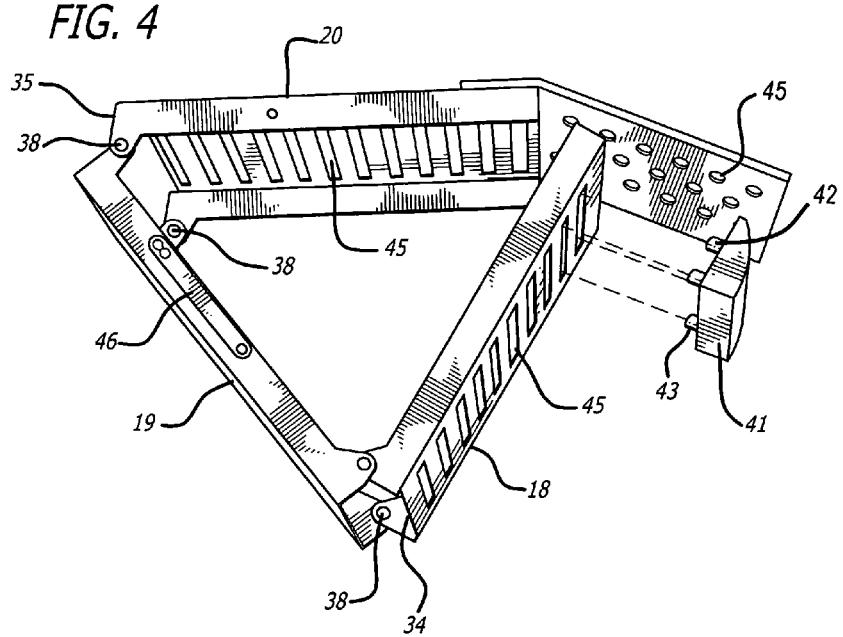
FIG. 4 is a perspective view showing the ramp partly unfolded from the second operative position to the first position.

The hinges 38 are located at adjacent ends of the respective elements and permit for the folding relationship in a transverse direction as further illustrated in FIG. 4. When in the extended position, the interfaces 34 and 35 are in engagement to prevent further unfolding of the elements beyond the sloped relationship as shown in FIG. 1.

As illustrated in FIG. 2, the vehicle 12 can be driven so that the tires of the wheels 39 and 40 mount the ramps at plates 27 and 29, respectively, and are mounted on the top of the elements 23 and 20 as illustrated.

Figure 3:
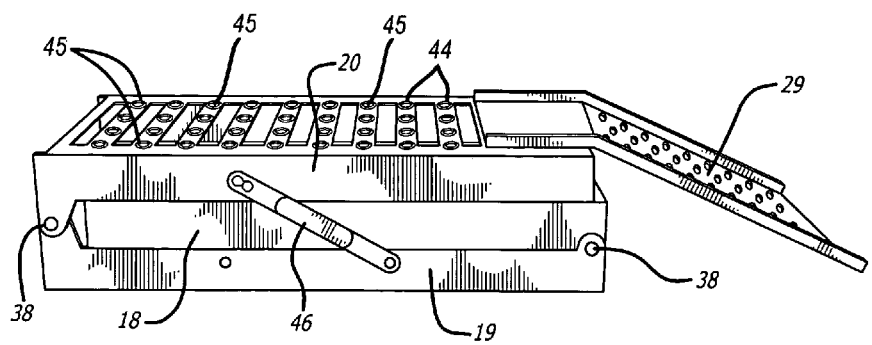
FIG. 3 is a perspective view showing the ramps in the folded second position.
Figure 5:
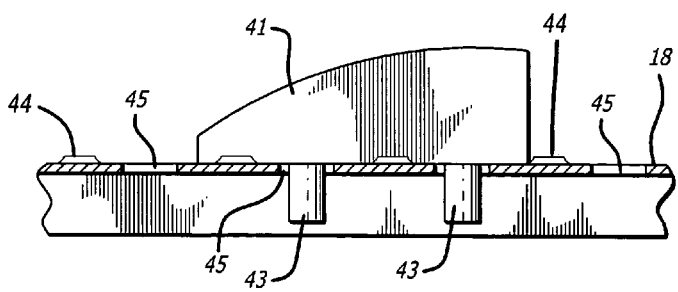
FIG. 5 is a sectional side view showing a stop in position on the ramp.

There are also stop members 41 and 42 which are removable from the elements 20, 23 as indicated. Each of the elements has apertures 45 in spaced relationship with each other. The apertures 45 receive studs 43 which extend from the stops 41 and act to position the stops 41 and 42 effectively on the element 20 and 23 respectively. Each of the circular apertures 45 can have one or more ridges or protrusions 44 which can act as friction elements. The apertures can also be longitudinal slots 45 arranged laterally across each of the elements 18, 19, 20, 21, 22 and 23 and the stops 41 and 42 fit into these slots. These slots act also to provide a degree of friction to each of the elements as vehicle wheels move over the elements and there can be ridges provided. The slots also lighten the ramp elements as is necessary. FIG. 4 does not show the circular holes which are shown in FIGS. 3 and 5.

In the fashion described, the elements 18, 19 and 20 of ramp 10 are folded in a longitudinal sense about the transverse or laterally arranged axes. In this manner the ramp 10 can be more compacted as necessary. Similarly, ramp 11 can be compacted as necessary by the folding along an elongated sense about the different lateral or transverse axes.

In other forms of the invention, there can be more or less elements for each of the ramps 10 or 11. Different folding arrangements are possible such that instead of the element 18 folding between the elements 19 and 20, a more zigzag type of folding arrangement is possible, namely in the form of a Z or S format.

A lock member or handle 46 is provided to engage the elements 20 and 19 so as to prevent inadvertent opening when the ramp is in the closed formation. The lock member 46 can be moved by unpinning the lock 46 from engaging one or both mating formations on the side of elements 19 and 20. The lock 46 is shown in the released position in FIG. 4. As such, the lock 46 traverses the intermediate element 18 when in the locked position.

Other hinge components or formations could also be utilized to perform the same function in other embodiments.

In some cases the elements can be folded laterally and otherwise stacked. As such, it can be possible to undo different elements from each other and reconfigure the elements with the stacked formation. The elements may be rotatable about side hinges transversely directed on the sides of the track face, rather than hinges transversely across the track face. Movable or separable elements for each ramp permits for the multi-purpose use of each ramp. Interlocking of the separate elements can provide the necessary degrees of stability for different uses.

While the apparatus and method has been described in terms of what is presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures.

What is claimed is:

1. A ramp for a vehicle comprising:
    an elongated track with a leading end and a trailing end, the leading end for engaging a horizontal platform of a vehicle, and the trailing end for engaging a ground surface so that there is a slope between the leading and trailing ends when the ramp is in a first usage relationship with the vehicle;
    the elongated track being constituted by multiple engaging elements,
    the elements being movable relative to each other, the elements are capable of being packed in a stack to define a platform for a wheel of a vehicle to permit raising of the wheel of a vehicle above the ground level, second usage of the ramp;
    wherein said platform has a top element that includes at least one aperture spaced for receiving at least one stud of a easily removable stop to hinder the vehicle from running past an end of the top element, the at least one stud being part of the stop and being spaced to correspond with the at least one aperture, the aperture being located distal from said end of the element the stud being capable of interacting with said aperture, without the use of securing means; and
    wherein there are at least three elements in a longitudinal relationship for the ramp, and there are hinges between the elements, the hinges and the elements being arranged so that a first end element folds between a mid element and a second end element in the second use.

2. A ramp as claimed in claim 1, further including a lead member having, a first portion for engaging with the element of the ramp in a substantially parallel relationship with the track, and a second portion angulated relative to the track of the ramp, the second portion for engaging on a horizontal platform of the vehicle when in a first use, and in a second use for engaging with the stacked elements, permitting a wheel of a vehicle to roll up and onto the stacked elements.

3. A ramp as claimed in claim 1, wherein the elements of the ramp are hinged at opposite ends for relative folding to permit for a stacked relationship.

4. A ramp as claimed in claim 1, including two separate ramps, each having a track, one track for permitting the front and rear left-hand wheels of an accessory to be rolled onto the horizontal platform related to the vehicle, and the other track for the front and rear wheels of the right-hand side of the accessory to be rolled onto the horizontal platform in the first use, and wherein the two tracks in a second use are for raising respectively left and right wheels of a vehicle.

5. A ramp as claimed in claim 1, including friction elements on a surface of the track, the friction elements being at least one of spaced slots, or apertures, and selectively with one or more ridges.

6. A ramp as claimed in claim 1, wherein the leading end includes a leading member in the form of an angulated plate anchored to the track.

7. A ramp as claimed in claim 1, wherein the hinge permits the elements to be rotated and the elements to fold in said second usage relationship, such that each element is stacked in a packed relationship; and permitting the elements to be unfolded into said first usage relationship, such that the elements are inhibited from unfolding beyond the elongated 1$^{st}$ usage relationship.

8. A ramp for a vehicle comprising:
an elongated track with a leading end and a trailing end, the leading end for engaging a flatbed platform of a vehicle, and the trailing end for engaging a ground surface so that there is a slope between the leading and trailing ends when the ramp is in a first usage relationship with the vehicle;
the elongated track being constituted by multiple engaging elements,
wherein said multiple engaging elements have at least one element that includes at least one aperture spaced for receiving at least one stud of a removable stop to facilitate positioning of the vehicle on the ramp and to binder an accessory from running past an end of the element, the at least one stud being part of the stop, the aperture being located at a distance from the end of the element, the stud being capable of interacting with said aperture, without the use of securing means;
the elements being movable relative to each other, the elements are capable of being packed in a stack to define a platform for a wheel of a vehicle to permit raising of the wheel of a vehicle above the ground level, and the raising of the vehicle above a ground level being a second usage of the ramp;
a leading member including two portions, a first portion for engaging with the element of the ramp in a substantially parallel relationship with the track, and a second portion angulated relative to the track of the ramp, the second portion being for engaging on the flatbed of the vehicle when in a first use, and in a second use being for engaging with the stacked elements thereby to facilitate permitting a wheel of a vehicle to roll up and onto the stacked elements, and wherein there are at least three elements in a longitudinal relationship for the ramp and there are hinges between the elements, the hinges and elements being arranged so that a first end element folds between a mid element and a second end element in the second use.

9. A ramp as claimed in claim 8, wherein the elements of the ramp are hinged to permit for a stacked relationship about adjacent ends.

10. A ramp as claimed in claim 9, including a pair of separate tracks, one track for permitting the front and rear left-hand wheels of an accessory to be rolled onto the flatbed related to the vehicle, and the other track for the front and rear wheels of the right-hand side of the accessory to be rolled onto the flatbed in the first use, and wherein the two tracks in a second use are for raising respectively left and right wheels of a vehicle.

11. A ramp as claimed in claim 10, including friction elements on a surface of the track, the friction elements being at least one of spaced slots, or apertures, selectively with one or more ridges.

12. A ramp as claimed in claim 8, wherein the leading member is anchored to the track.

13. A ramp as claimed in claim 8, wherein the hinge permits the elements to be rotated and the elements to fold in said second usage relationship, such that each element is stacked in a packed relationship; and permitting the elements to be unfolded into said first usage relationship, such that the elements are inhibited from unfolding beyond the elongated 1$^{st}$ usage relationship.

14. A ramp for a vehicle comprising:
an elongated track with a leading end and a trailing end, the leading end for engaging a horizontal platform of a vehicle, and the trailing end for engaging a ground surface so that there is a slope between the leading and trailing ends when the ramp is in a first usage relationship with the vehicle;
the elongated track being constituted by multiple engaging elements,
the elements being movable relative to each other, the elements are capable of being packed in a stack to define a platform for a wheel of a vehicle to permit raising of the wheel of a vehicle above the ground level, being a second usage of the ramp; and
wherein said platform has a top element that includes at least one aperture spaced for receiving at least one stud of a easily removable stop to hinder the vehicle from running past an end of the top element, the at least one stud being part of the stop and being spaced to correspond with the at least one aperture, the aperture being located distal from said end of the element, the stud being capable of interacting with said aperture, without the use of securing means, wherein said aperture is an essentially longitudinal slot arranged laterally across each element.

15. A ramp for a vehicle comprising:
an elongated track with a leading end and a trailing end, the leading end for engaging a horizontal platform of a vehicle, and the trailing end for engaging a ground surface so that there is a slope between the leading and trailing ends when the ramp is in a first usage relationship with the vehicle;
the elongated track being constituted by multiple engaging elements,
the elements being movable relative to each other, the elements are capable of being packed in a stack to define a platform for a wheel of a vehicle to permit raising of the wheel of a vehicle above the ground level, being a second usage of the ramp; and
wherein said platform has a top element that includes at least one aperture spaced for receiving at least one stud of a easily removable stop to hinder the vehicle from running past an end of the top element, the at least one stud being part of the stop and being spaced to correspond with the at least one aperture, the aperture being located distal from said end of the element, the stud being capable of interacting with said aperture, without the use of securing means, wherein said aperture is an essentially longitudinal slot arranged laterally across each element.

16. A ramp for a vehicle comprising:
an elongated track with a leading end and a trailing end, the leading end for engaging a horizontal platform of a vehicle, and the trailing end for engaging a ground surface so that there is a slope between the leading and trailing ends when the ramp is in a first usage relationship with the vehicle;
the elongated track being constituted by multiple engaging elements,
the elements being movable relative to each other, the elements are capable of being packed in a stack to define a platform for a wheel of a vehicle to permit raising of the wheel of a vehicle above the ground level, a second usage of the ramp; and wherein said platform has a top element that includes a plurality of spaced apart apertures wherein said aperture are essentially spaced slots longitudinally arranged laterally across the top element for receiving a plurality of studs of a removable stop to hinder the vehicle from running past an end of the element, the plurality of studs being part of the stop and spaced to correspond with the spaced apart apertures, the apertures being located distal from said end of the element, the stud being capable of interacting with said aperture, without the use of securing means.

17. The ramp of claim 16 wherein the top element includes two sets of apertures, both sets being distal from said end.

18. The ramp of claim 17 wherein the stop extends between both sets of apertures.

19. The ramp of claim 16 wherein the stop does not extend down the end of the ramp.

* * * * *